(12) United States Patent
Jang (10) Patent No.: US 8,301,153 B2
(45) Date of Patent: Oct. 30, 2012

(54) METHOD OF ALLOCATING RESOURCE FOR HIERARCHICAL CELLULAR SYSTEM AND TRANSMISSION FRAME FOR PERFORMING THE METHOD

(75) Inventor: Kyung Hun Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 372 days.

(21) Appl. No.: 12/626,650

(22) Filed: Nov. 26, 2009

(65) Prior Publication Data

US 2010/0291938 A1     Nov. 18, 2010

(30) Foreign Application Priority Data

May 15, 2009   (KR) .......................... 10-2009-0042516

(51) Int. Cl.
*H04W 72/00* (2009.01)

(52) U.S. Cl. .................. 455/450; 455/452.1; 455/452.2; 455/453; 455/449; 455/444

(58) Field of Classification Search .................. 455/450, 455/436, 525, 444, 422.1, 452.1, 452.2, 453, 455/449; 370/331, 332
See application file for complete search history.

(56) References Cited

U.S. PATENT DOCUMENTS 5,623,535 A * 4/1997 Leung et al. .................. 455/444

FOREIGN PATENT DOCUMENTS

| EP | 1 313 338 A1 | 5/2003 |
|----|--------------|--------|
| EP | 1313338 | * 5/2003 |
| JP | 08-140135 | 5/1996 |
| JP | 2003-009216 | 1/2003 |
| KR | 1020040055075 | 6/2004 |

OTHER PUBLICATIONS

Lagrange, Xavier; IEEE Communications Magazine, Aug. 1997 (0163-6804/97).*

* cited by examiner

*Primary Examiner* — Kamran Afshar
*Assistant Examiner* — Manpreet Matharu
(74) *Attorney, Agent, or Firm* — NSIP Law

(57) ABSTRACT

Described herein is a resource allocation method for a hierarchical cellular system, and a transmission frame for performing the method. A macrocell dedicated resource and a shared resource are respectively controlled based on a usage rate of the macrocell dedicated resource and a usage rate of the shared resource. The macrocell reports a usage plan of the shared resource that the macrocell uses to a small cell, and the small cell may allocate the shared resource to terminals based on the usage plan of the shared resource. A control message related to the usage plan may be transmitted/received via the transmission frame.

18 Claims, 9 Drawing Sheets

X : BOUNDARY BETWEEN $R_{Macro}$ AND $R_{Shared}$
A : $R_{Macro}$
B : RESOURCE THAT IS USED BY MACRO CELL AMONG $R_{Shared}$
C : RESOURCE THAT IS NOT USED BY MACRO CELL AMONG $R_{Shared}$

METHOD OF ALLOCATING RESOURCE FOR HIERARCHICAL CELLULAR SYSTEM AND TRANSMISSION FRAME FOR PERFORMING THE METHOD

CROSS-REFERENCE TO RELATED APPLICATION

This application claims the benefit under 35 U.S.C. §119(a) of a Korean Patent Application No. 10-2009-0042516, filed on May 15, 2009, in the Korean Intellectual Property Office, the entire disclosure of which is incorporated herein by reference for all purposes.

BACKGROUND

1. Field

The following description relates to a resource allocating method for a communication system, and more particularly, to a radio resource allocating method for a plurality cells in a hierarchical cellular system that use the same frequency.

2. Description of Related Art

Researches on a communication system that includes a plurality of transmission/reception pairs to increase data transmission rate and reliability of communication have been conducted. Two or more of the plurality of transmission/reception pairs may use the same frequency resource to improve frequency efficiency.

When the plurality of transmission/reception pairs use the same frequency resource, interference may occur between the plurality of transmission/reception pairs. Various researches have been performed to reduce or to eliminate the interference between the plurality of transmission/reception pairs by sharing interference channel information of the plurality of transmission/reception pairs.

Technologies that use small cells, such as picocells, femtocells, microcells, and the like, may be used to increase the capacity of a network. When a small cell uses a frequency resource that is the same as a frequency resource of an adjacent macrocell, interference may occur between transmission/reception pairs of the small cell and transmission/reception pairs of the macrocell. The interference may limit frequency efficiency and may cause a decrease in reliability of communication. Processing of the interference by continuously sharing and updating the interference channel information between the small cell and the macrocell may cause an increase in overhead in the communication system.

SUMMARY

According to one general aspect, a method of allocating a resource for a hierarchical cellular system, includes recognizing a usage rate of a macrocell dedicated resource that a macrocell uses and a usage rate of shared resource that the macrocell and a small cell use, controlling the macrocell dedicated resource and the shared resource based on the usage rate of the macrocell dedicated resource and the usage rate of the shared resource, and allocating the controlled macrocell dedicated resource and the controlled shared resource to the macrocell and the small cell.

The macrocell may report a usage plan of the shared resource to the small cell before the macrocell uses the shared resource.

The small cell may allocate the shared resource to terminals served by the small cell, and the allocation may be based on a usage plan of the shared resource.

The small cell may recognize a resource that is not used by the macrocell from among the shared resource, based on a usage plan of the shared resource, and allocate a recognized resource to terminals served by the small cell.

A resource used by the macrocell from among the shared resource may be allocated to terminals served by the small cell, and the macrocell and the small cell may use at least one of a transmission power controlling scheme, an interference controlling scheme, and a multi-antenna transmission scheme to control interference.

The small cell may allocate a resource that is not used by the macrocell from among the shared resource to terminals having a relatively high mobility among terminals served by the small cell, and allocate a resource that is used by the macrocell from among the shared resource to terminals having a relatively low mobility among the terminals served by the small cell.

At least one of the macrocell dedicated resource and the shared resource may be allocated to terminals served by the macrocell based on the mobility of the terminals.

The macrocell dedicated resource may be allocated to terminals served by the macrocell that have a relatively high mobility, and the shared resource may be allocated to terminals served by the macrocell that have a relatively low mobility.

The controlling of the macrocell dedicated resource and the shared resource may include decreasing an amount of the shared resource when the macrocell dedicated resource increases, and increasing an amount of the shared resource when the macrocell dedicated resource decreases.

The macrocell may report a usage plan of the shared resource to the small cell at predetermined intervals before the macrocell uses the shared resource.

The macrocell and the small cell may use the same resource.

The small cell may have a cell coverage that overlaps with a cell coverage of the macrocell, and the small cell may be one of a femtocell or a picocell.

According to another aspect, a coordinator for allocating a resource includes a recognizing unit to recognize a usage rate of a macrocell dedicated resource that a macrocell uses and a usage rate of shared resource that the macrocell and a small cell use, a controlling unit to control the macrocell dedicated resource and the shared resource based on the usage rate of the macrocell dedicated resource and the usage rate of the shared resource, and an allocating unit to allocate the controlled macrocell dedicated resource and the controlled shared resource to the macrocell and the small cell.

The macrocell may report a usage plan of the shared resource to the small cell before the macrocell uses the shared resource.

A resource that is used by the macrocell from among the shared resource may be allocated to terminals served by the small cell, and the macrocell and the small cell may use at least one of a transmission power controlling scheme, an interference controlling scheme, and a multi-antenna transmission scheme, to control interference.

According to still another aspect, there is provided a communication device for performing communication according to a transmission frame in a hierarchical cellular system, wherein the transmission frame comprises a control zone including a control message related to a usage plan of a shared resource, and a given resource is classified into one of a macrocell dedicated resource that a macrocell uses and the shared resource that the macrocell and a small cell use.

The macrocell may report the usage plan of the shared resource to the small cell using the control message, and the small cell may allocate the shared resource to terminals served by the small cell based on the usage plan of the shared resource.

The transmission frame may further include an access zone that includes at least one of a sub-frame for data communication of the macrocell and a sub-frame for data communication of the small cell, wherein the at least one sub-frame for the data communication of the macrocell includes MAP information of a resource allocated to the macrocell among the macrocell dedicated resource and the shared resource, and the at least one sub-frame for the data communication of the small cell includes MAP information of a resource among the shared resource scheduled for the small cell.

The at least one sub-frame for the data communication of the small cell may include at least one of synchronization information of the small cell and network information of the small cell.

The control zone may further include at least one of synchronization information of the macrocell and network information of the macrocell.

The macrocell dedicated resource and the shared resource may be controlled based on a usage rate of the macrocell dedicated resource and a usage rate of the shared resource.

The transmission frame may include the control zone at predetermined intervals.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. Also, descriptions of well-known functions and constructions may be omitted for increased clarity and conciseness.

Figure 1:
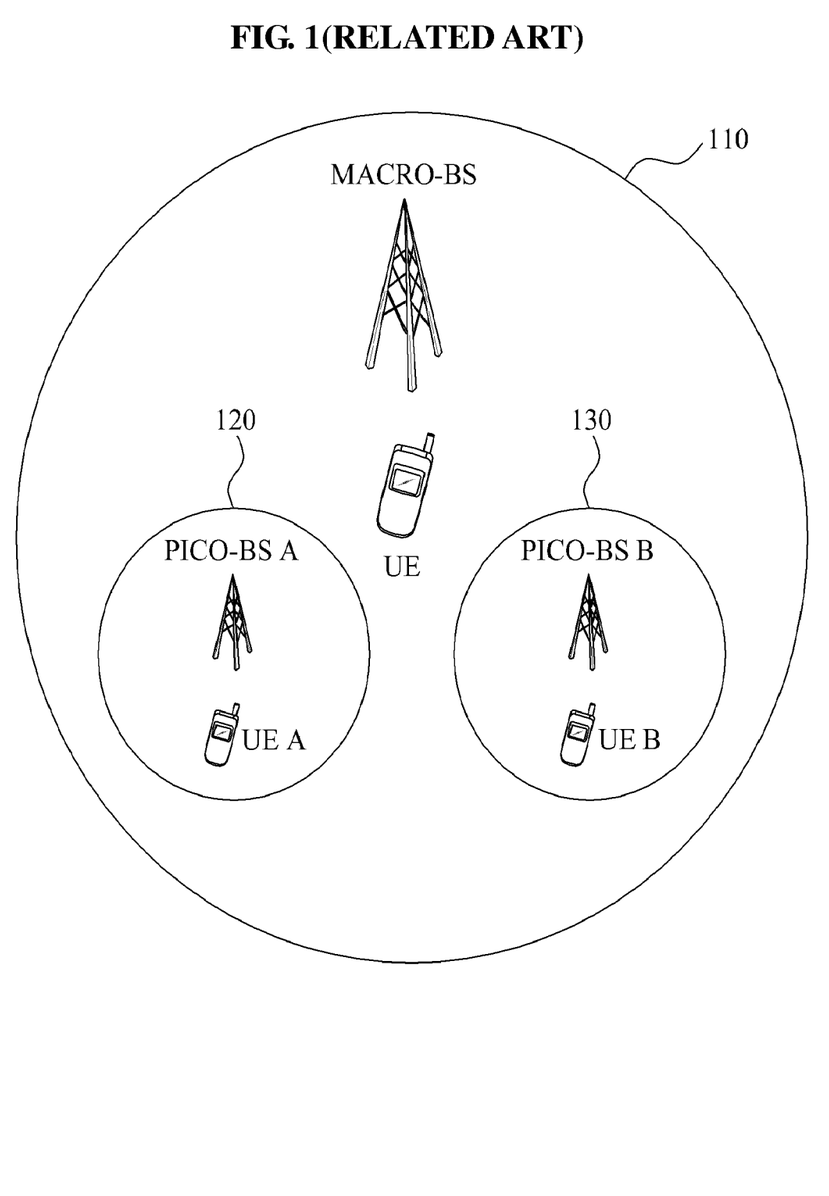
FIG. 1 is a diagram illustrating a hierarchical cellular system of a related art.

FIG. 1 is a diagram illustrating a non-limiting example of a hierarchical cellular system. An exemplary resource allocation method and an exemplary transmission frame are applicable in the hierarchical cellular system of FIG. 1.

Referring to FIG. 1, the hierarchical cellular system may include a coverage area of a macrocell 110 and coverage areas of picocells 120 and 130. Picocells are examples of small cells, and may be replaced with other small cells, for example, femtocells, microcells, and the like.

As described herein, a small cell may include a plurality of small cells. The small cell may be a picocell, a femtocell, a microcell, and the like. The small cell may serve one or more terminals located within a coverage area of the small cell. The terminals may have varying degrees of mobility. In a non-limiting example, a terminal with relatively high mobility may be capable of being relatively mobile, for example, a mobile terminal, and the like. A terminal with relatively low mobility may be relatively stationary, for example, a fixed terminal, and the like.

The macrocell 110 may include a macrocell base station (macro-BS), and the macro-BS may serve terminals, for example, user equipment (UE) included in the coverage area of the macrocell 110. The macro-BS may serve a picocell base station A (pico-BS A), and a pico base station B (pico-BS B). The terminal A (UE A) is included in the coverage of pico-BS A and the terminal B (UE B) is included in the coverage of pico-BS B.

A terminal UE is included in the coverage of the macrocell 110 but is not included in the coverage of the picocells 120 and 130. Regarding the terminal UE, interference between the macrocell 110 and the picocells 120 and 130 may be relatively low. The terminal UE A is included in both the coverage of the macrocell 110 and the coverage of the picocell 120, and the terminal UE B is included in both the coverage of the macrocell 110 and the coverage of the picocell 130. Regarding the terminal UE A, interference between the macrocell 110 and the picocell 120 may be high, for example, when the macrocell 110 and the picocell 120 use the same frequency resource. Regarding the terminal UE B, interference between the macrocell 110 and the picocell 130 may be high, for example, when the macrocell 110 and the picocell 130 use the same frequency. A radio resource may be allocated to prevent the interference or to process the interference.

The exemplary hierarchical cellular system may classify a given resource into one of a macrocell dedicated resource for the macrocell 110 and a shared resource for both the macrocell 110 and at least one of the picocells 120 and 130. A macrocell dedicated resource is for the macrocell and is not used by a picocell. The shared resource is a radio resource that is used by both the macrocell 110 and at least one of the picocells 120 and 130.

The macro-BS may communicate with the terminal UE A using the macrocell dedicated resource or the shared resource, and the pico-BS A may communicate with the terminal UE A using the shared resource. In this example, the pico-BS A, together with the macro-BS, may use a portion that is used by the macro-BS among the shared resource, and may use a portion that is not used by the macro-BS among the shared resource. The pico-BS A may use a portion of the shared resource that is used by the macro-BS. The pico-BS A may use a portion of the shared resource that is not used by the macro-BS. The pico-BS A and the macro-BS may use the shared resource simultaneously.

Described herein are various embodiments including adaptively controlling the macrocell dedicated resource and the shared resource, allocating the macrocell dedicated resource and the shared resource, and reporting the macrocell usage plan of the shared resource that the macrocell uses, to picocells 120 and 130.

The methods described herein may be implemented into cellular communication systems. The cellular system may adaptively control the macrocell dedicated resource and the shared resource while monitoring a usage rate of the macrocell dedicated resource and a usage rate of the shared resource. For example, when the usage rate of the macrocell dedicated resource is high and the usage rate of the shared resource is low, an amount of resource dedicated to the macrocell dedicated resource may be increased and an amount of resource dedicated to the shared resource may be decreased, in a given radio resource.

When the pico-BS A and the macro-BS use the same frequency resource, the pico-BS A and the macro-BS may use a scheme for processing or preventing interference. The scheme may be, for example, a transmission power controlling scheme, an interference controlling scheme, a multi-antenna transmission scheme, a combination thereof, and the like.

The hierarchical cellular system illustrated in FIG. 1 is an example, and is not meant to limit the teachings described herein. A system may comprise one or more macrocells and one or more small cells, for example, one or more picocells, one or more femtocells, one or more microcells, one or more nanocells, a combination thereof, and the like.

<Exemplary Scheme for Processing or Preventing Interference>

Figure 2:
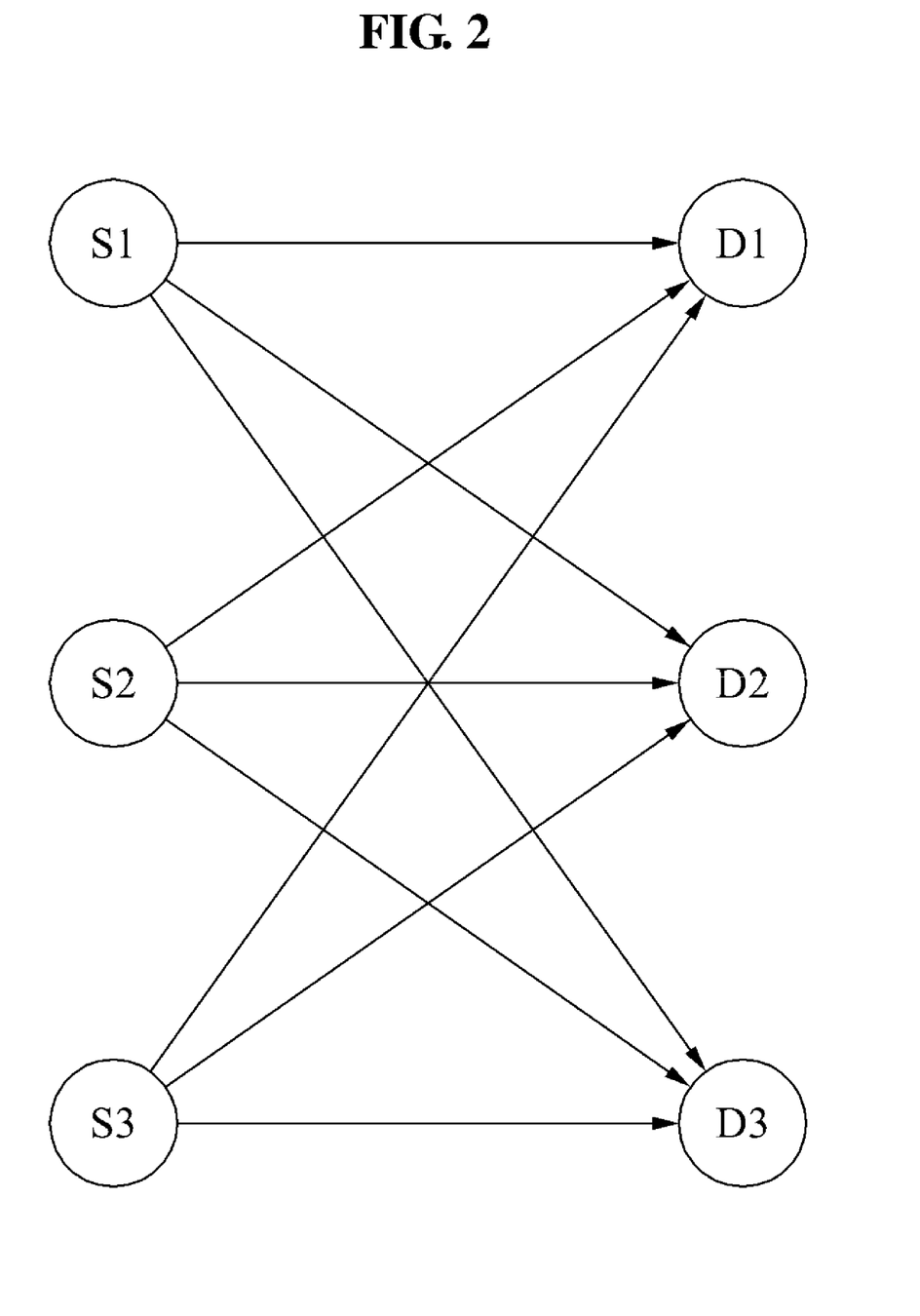
FIG. 2 is a diagram illustrating exemplary schemes that process interferences between a plurality of transmission/reception pairs.

FIG. 2 illustrates exemplary schemes that process interferences between a plurality of transmission/reception pairs.

As a non-limiting example, referring to FIG. 2, a first pair of a source node S1 and a destination node D1, a second pair of a source node S2 and a destination node D2, and a third pair of a source node S3 and a destination node D3, constitute the transmission/reception pairs. In this example, each of the source nodes is a 'transmitter', for example, the source nodes may be base stations or relay stations during a downlink communication of a cellular system, or the source nodes may be terminals or relay stations during an uplink communication. In this example, each of the destination nodes is a 'receiver', for example, the destination nodes may be a terminal or a relay station during a downlink communication of the cellular system, or the destination nodes may be a base station or a relay station during uplink communication.

In this example, when each of the source nodes transmits data using the same frequency resource, interference may occur in each of the destination nodes. A desired signal is a signal received by the destination node D1 from the source node S1, and signals received from the source node S2 and S3 are interference. In the same manner, interference may occur in the destination nodes D2 and D3. The interference may cause a decrease in throughput of the communication system.

The decrease in the throughput due to the interference may be mitigated using a scheme for processing or preventing the interference. For example, a scheme for processing or preventing the interference may include an interference controlling scheme, a transmission power controlling scheme, a multi-antenna transmission scheme, a combination thereof, and the like.

An exemplary interference controlling scheme and a transmission power controlling scheme, are described herein. The interference controlling scheme may include, for example, an interference alignment scheme, an interference treated as noise (ITN) scheme, an interference neutralization scheme, a combination thereof, and the like.

According to the interference alignment scheme, each of the source nodes may design and use a precoding matrix to enable interferences of each destination node to be aligned. Each of the destination nodes also may use an appropriate decoding matrix to align and eliminate the interferences. In this example, the precoding matrix and the decoding matrix may be calculated based on interference channel information of the destination nodes. The interference channels of the destination node D1 include a channel between the source node S2 and the destination node D1 and a channel between the source node S3 and the destination node D1. The interference channels of the destination node D2 include a channel between the source node S1 and the destination node D2 and a channel between the source node S3 and the destination node D2. The interference channels of the destination node D3 include a channel between the source node S1 and the destination node D3 and a channel between the source node S2 and the destination node D3.

Each of the destination nodes feeds back to the source nodes, interference channel information that includes information of interference channels. The interference channel information enables the transmission/reception pairs to use the interference alignment scheme. In this example, the source nodes share the interference channel information of the destination nodes to apply the interference alignment scheme. The interference alignment scheme may include a concept of the interference neutralization scheme that controls transmission signals of the source nodes so that phases of the interference signals have a difference of approximately 180 degrees.

The interference treated as noise (ITN) scheme is a scheme of generating the transmission signals of the source nodes to weaken the strength of the interference signals of each destination node. For example, the ITN scheme may generate the transmission signals such that a sum of interference signals is less than or equal to a predetermined level. The sum of interference signals may be weakened such that the sum is relatively smaller than the desired signal The interference neutralization scheme controls phases of the transmission signals so that the interference signals have a difference of approximately 180 degrees from each other. According to the interference neutralization scheme, the destination nodes regard interference signals having a phase difference of about 180 degrees as a single interference signal.

The transmission power controlling scheme may control the strength of interference signals based on gains of the interference channels. For example, the transmission power controlling scheme may control transmission power of each of the source nodes based on the gains of interference channels according to the frequency and gain of a channel corresponding to the desired signal, thereby improving the throughput of the communication system. An exemplary transmission power controlling scheme is Dynamic Spectrum Management.

According to the multi-antenna transmission scheme, the source nodes may perform beamforming to enable the desired signal to be concentrated on a predetermined destination node. The beamforming may be performed using an appropriately designed beamforming matrix or a precoding matrix. The beamforming matrix and/or the precoding matrix may be a vector matrix. Accordingly, each of the destination nodes may extract the desired signal with only a small amount of interference, and the destination nodes may perform reception beamforming and/or use a spatial filter to reduce the interference.

<Exemplary Adaptive Control of a Macrocell Dedicated Resource and a Shared Resource>

Figure 3:
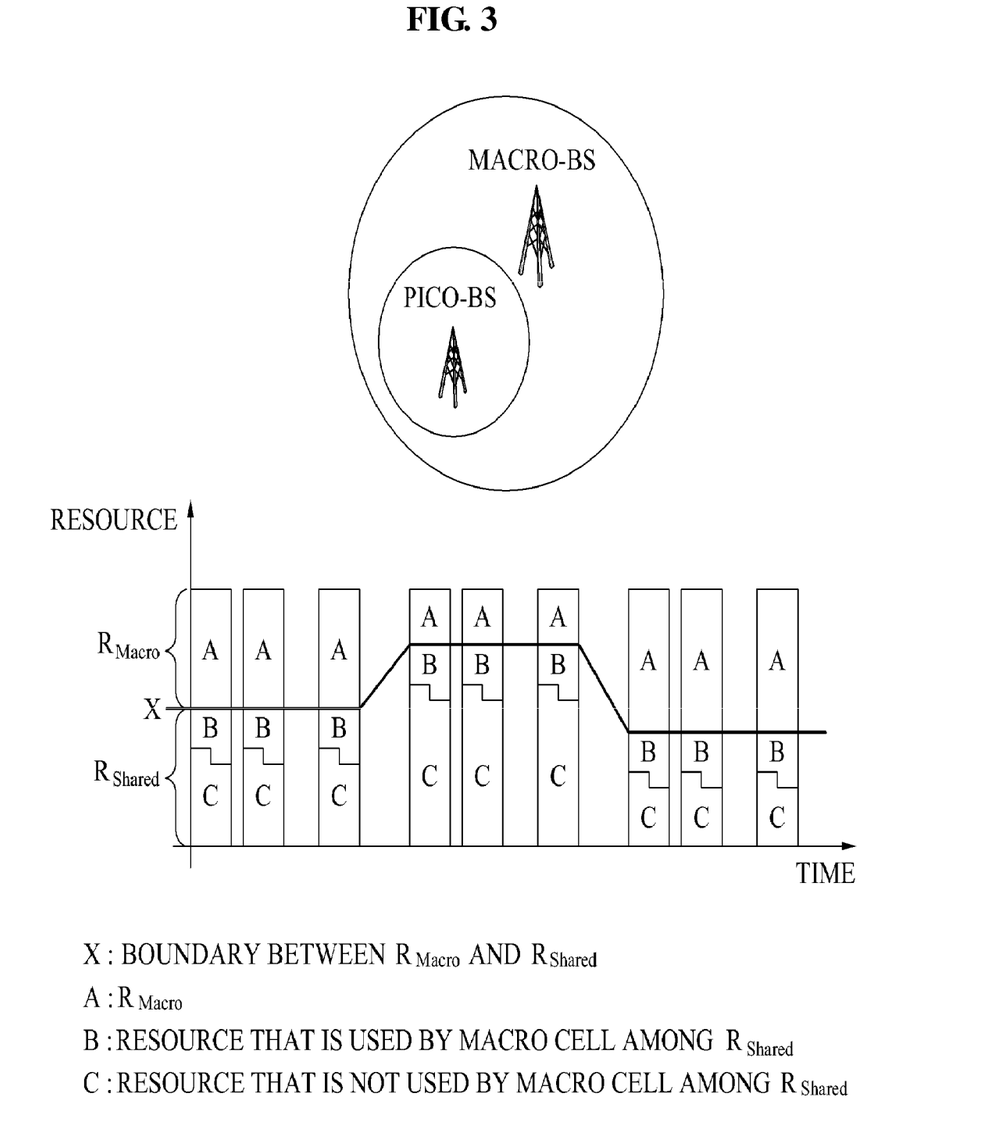
FIG. 3 is a diagram including a graph of resource over time illustrating a macrocell dedicated resource and a shared resource.

FIG. 3 is a diagram including a graph of a resource allocation over time including the allocation of a macrocell dedicated resource and a shared resource. The macrocell dedicated resource and a shared resource are outputted to one or more terminals.

Illustrated in FIG. 3, is a non-limiting example of a hierarchical cellular system that includes a single macrocell including a macro-BS, and a single picocell including a pico-BS. The coverage of the macrocell may include the coverage of the picocell. In some embodiments, the cellular system may comprise one or more macrocells that have a coverage that includes the coverage, or a portion of the coverage, of one or more small cells.

The graph of FIG. 3 illustrates the macrocell dedicated resource and the shared resource over time. The macrocell dedicated resource is only for the macrocell and is labeled $R_{Macro}$, and the shared resource that is a radio resource for both the macrocell and the picocell is labeled $R_{Shared}$. In this example, A indicates the macrocell dedicated resource $R_{Macro}$, B indicates a radio resource used by the macrocell among the shared resource $R_{Shared}$, and C indicates a radio resource that is not used by the macrocell among the shared resource $R_{Shared}$. X is a line indicating a boundary between the macrocell dedicated resource, $R_{Macro}$, and the shared resource, $R_{Shared}$.

The macro-BS may periodically check a usage rate of the macrocell dedicated resource $R_{Macro}$ and a usage rate of the shared resource $R_{Shared}$, and adaptively control the macrocell dedicated resource $R_{Macro}$ and the shared resource $R_{Shared}$ based on a result of the checked usage rates. In this example, the amount of the macrocell dedicated resource $R_{Macro}$ and the amount of the shared resource $R_{Shared}$ are constantly maintained during the first three time sections. During a fourth time section, the amount of the macrocell dedicated resource $R_{Macro}$ decreases and the amount of the shared resource $R_{Shared}$ increases. During a seventh time section, the amount of the macrocell dedicated resource $R_{Macro}$ increases and the amount of the shared resource $R_{Shared}$ decreases.

When the usage rate of the macrocell dedicated resource $R_{Macro}$ is relatively higher than the usage rate of the shared resource $R_{Shared}$, the macro BS may increase the macrocell dedicated resource $R_{Macro}$ and decrease the shared resource $R_{Shared}$. When the usage rate of the macrocell dedicated resource $R_{Macro}$ is relatively lower than the usage rate of the shared resource $R_{Shared}$, the macro BS may decrease the macrocell dedicated resource $R_{Macro}$ and may increase the shared resource $R_{Shared}$.

In one example, the macro-BS may allocate the macrocell dedicated resource $R_{Macro}$ to terminals having a relatively high mobility, and may allocate a radio resource B to terminals having a relatively low mobility. The radio resource B may be used by the macrocell among the shared resource $R_{Shared}$. The above described schemes for processing or preventing the interference may be applied to the radio resource B that is used by the macrocell, and the above described schemes may be applied to the terminals having a relatively low mobility. The radio resource B that is used by the macrocell among the shared resource $R_{Shared}$ may vary over time.

The macro-BS may report a usage plan of the radio resource B before the macrocell uses the shared resource $R_{Shared}$. The usage plan may include information about which frequency resource will be used by the macrocell among the shared resource and when the macrocell will use the shared resource.

In the example illustrated in FIG. 3, the pico-BS may allocate the shared resource $R_{Shared}$ to terminals of the pico-BS based on the usage plan of the radio resource B.

The pico-BS may allocate the radio resource C that is not used by the macrocell among the shared resource $R_{Shared}$, to the terminals of the pico-BS, to prevent interference.

The pico-BS may allocate the radio resource B to the terminals of the pico-BS. In this instance, the radio resource B that is used by the macrocell among the shared resource $R_{Shared}$ is used by both the macro-BS and the pico-BS and the schemes for processing or preventing the interference may be applied. To apply the schemes for processing or preventing the interference, the pico-BS may allocate to terminals having a relatively low mobility, the radio resource B that is used by the macrocell. The pico-BS may allocate to terminals having a relatively high mobility, the radio resource C that is not used by the macrocell.

The macro-BS and the pico-BS may be wired or wirelessly connected, and may transmit/receive information related to a usage plan of the radio resource B. According to a transmission frame described with reference to FIGS. 6 through 8, the macro-BS and the pico-BS may transmit/receive information related to the usage plan of the radio resource B.

<Exemplary Allocation of Macrocell Dedicated Resource and Shared Resource Based on Mobility of Terminals>

Figure 4:
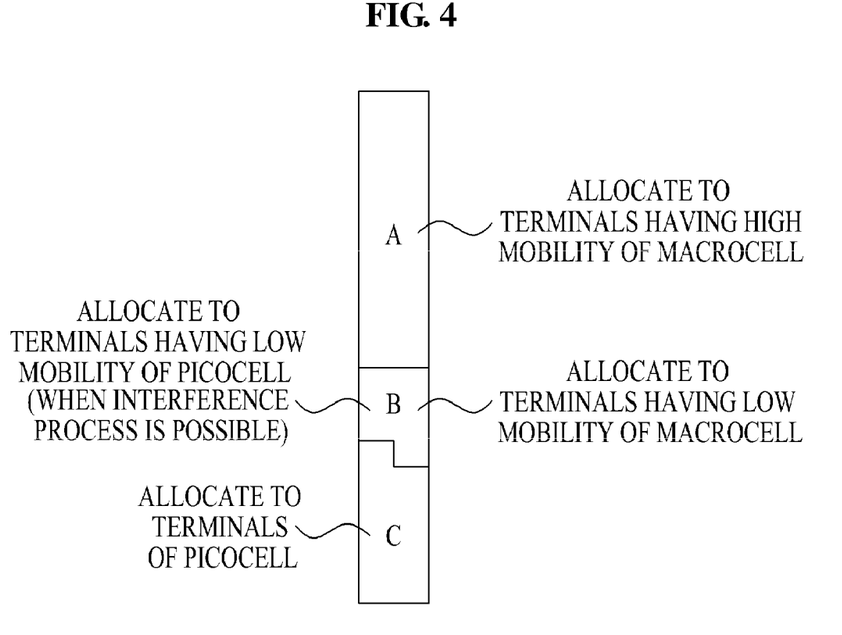
FIG. 4 is a diagram illustrating a time section of the graph of FIG. 3.

FIG. 4 illustrates a time section of the resource allocation graph of FIG. 3, including resource allocation of a macrocell dedicated resource and a shared resource, to terminals, according to the mobility of the terminals. In the non-limiting example illustrated in FIG. 4, A indicates a macrocell dedicated resource $R_{Macro}$, B indicates a radio resource that is used by the macrocell among the shared resource $R_{Shared}$, and C indicates a radio resource that is not used by the macrocell among the shared resource $R_{Shared}$.

When controlling of the macrocell dedicated resource $R_{Macro}$ and the shared resource $R_{Shared}$ is finished, the macrocell and a picocell may allocate the cell dedicated resource $R_{Macro}$ and the shared resource $R_{Shared}$.

The macrocell may use only the macrocell dedicated resource $R_{Macro}$. The macrocell may use only the shared resource. The macrocell may use both the macrocell dedicated resource and the shared resource. When the macrocell uses the shared resource $R_{Shared}$, the macrocell may allocate A to terminals having a relatively high mobility, and may allocate B to terminals having a relatively low mobility. In this example, A indicates the macrocell dedicated resource $R_{Macro}$, and B indicates the radio resource that is used by the macrocell among the shared resource $R_{Shared}$.

The picocell may use only the radio resource C that is not used by the macrocell among the shared resource $R_{Shared}$. When the picocell uses resource B which is the radio resource used by the macro cell among the shared resource $R_{Shared}$, the picocell may allocate B to terminals having a low mobility so as to apply the schemes for processing or preventing the interference. The picocell and/or the macrocell may apply the schemes for processing or preventing interference.

Figure 5:
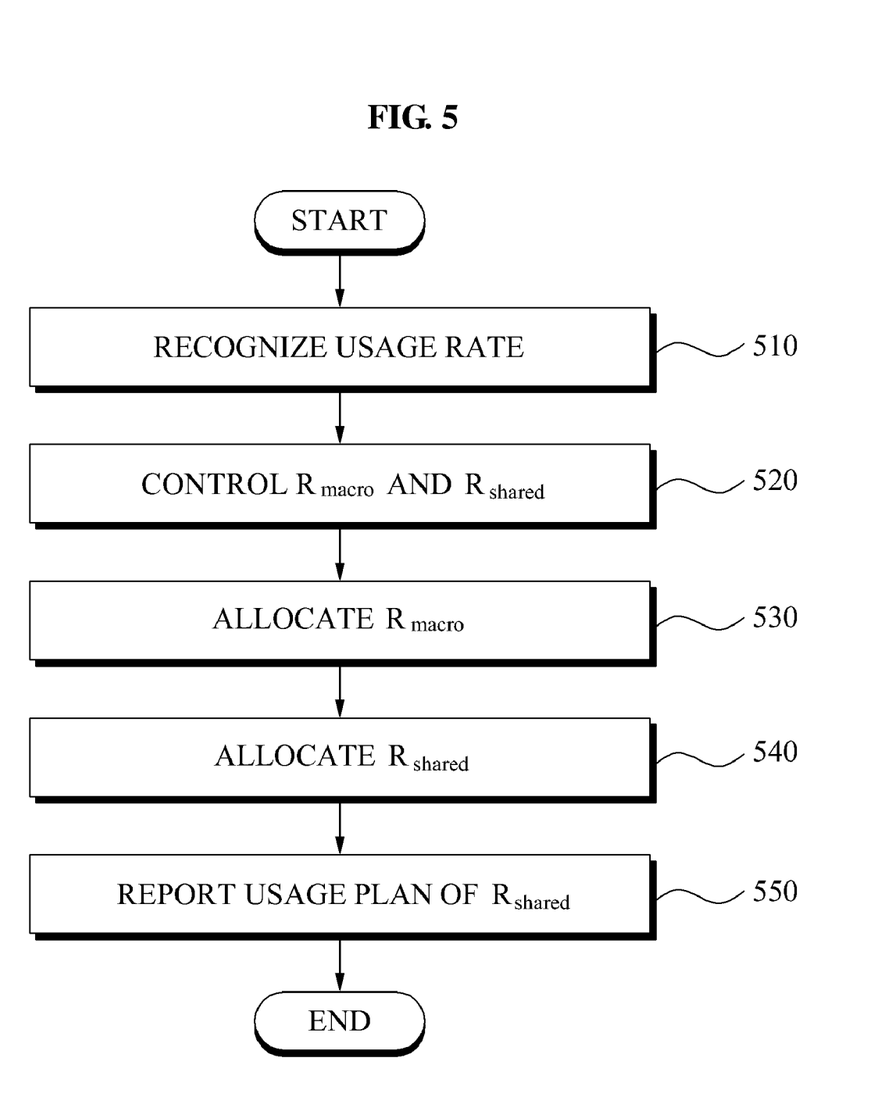
FIG. 5 is a flowchart illustrating an exemplary resource allocation method.

FIG. 5 is a flowchart illustrating an exemplary resource allocation method.

Referring to FIG. 5, in 510 the resource allocation method recognizes a usage rate of a macrocell dedicated resource that a macrocell uses, and a usage rate of a shared resource that the macrocell and a small cell use.

The resource allocation method controls the macrocell dedicated resource $R_{Macro}$ and the shared resource $R_{Shared}$ based on the usage rate of the macrocell dedicated resource $R_{Macro}$ and the usage rate of the shared resource $R_{Shared}$ in

520. The resource allocation method allocates the macrocell dedicated resource $R_{Macro}$ to the macrocell in 530.

The resource allocation method allocates the shared resource $R_{Shared}$ to the macrocell as appropriate in 540. In 550, the resource allocation method reports a usage plan of the shared resource $R_{Shared}$ allocated to the macrocell to the small cell.

Figure 6:
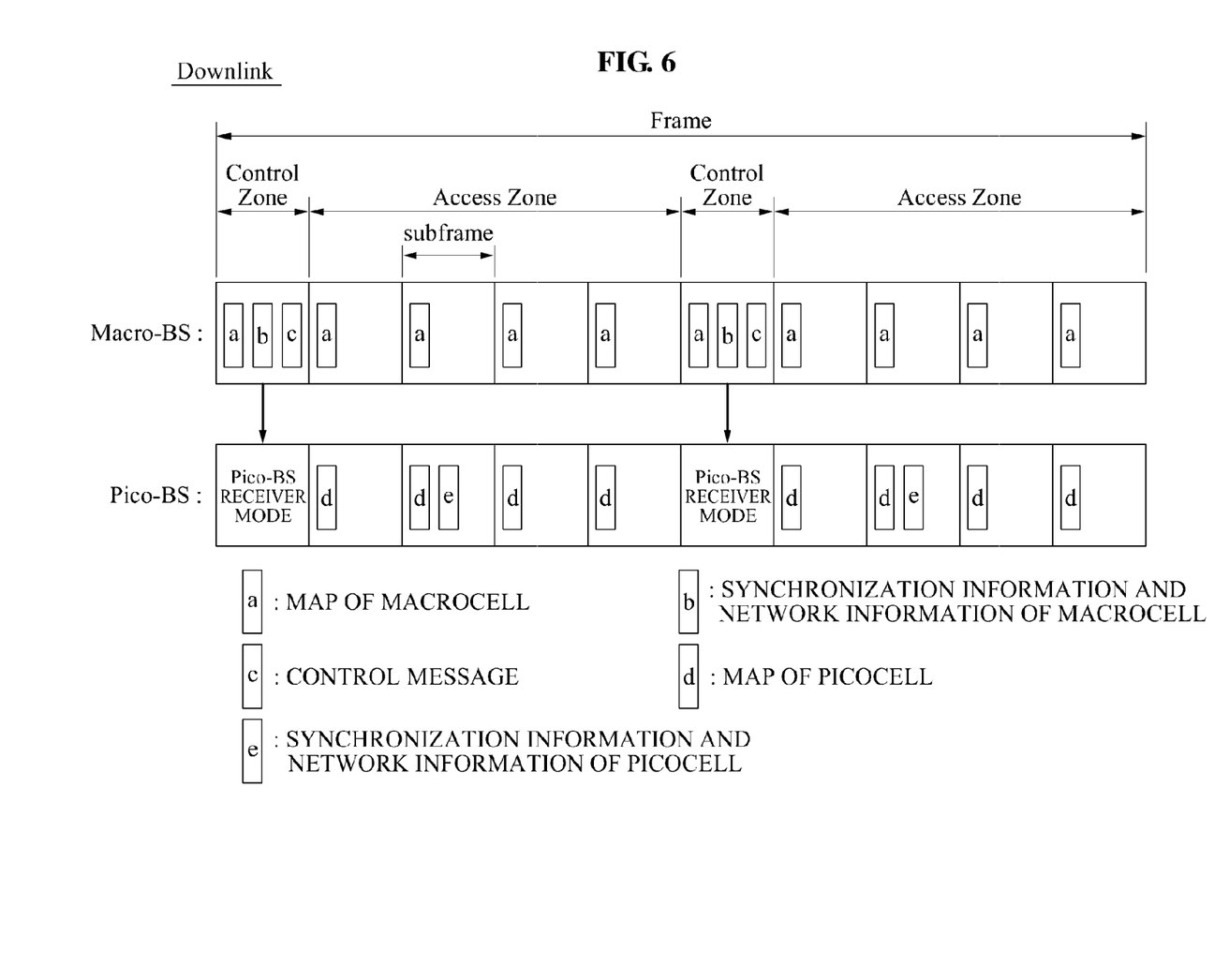
FIG. 6 is a diagram illustrating an exemplary downlink transmission frame.

FIG. 6 illustrates an exemplary downlink transmission frame.

Referring to FIG. 6, the downlink transmission frame may include one or more control zones and/or one or more access zones.

The control zone may be included, for example, in the downlink transmission frame of a macro-BS, and the control zone may include MAP (Mobile Anchor Point) information (a) of the macrocell, network information and synchronization information (b) of the macrocell, and/or a control message (c). The control message (c) together with the network information and synchronization information of the macrocell (b) may be included in the control zone.

The MAP information (a) of the macrocell may include scheduling information of a resource allocated to the macrocell among the shared resource and the macrocell dedicated resource. The terminals of the macrocell may recognize a resource scheduled for downlink use based on the MAP information (a) of the macrocell.

The network information of the macrocell may be information required for accessing the macrocell, for example, an ID of the macrocell. The synchronization information of the macrocell may be information of a time synchronization applied to the macrocell. As illustrated in FIG. 6, the terminals of the macrocell may receive from the macro-BS the network information and the synchronization information (b) using the control zone.

The access zone included in the downlink transmission frame of the macro-BS may include a plurality of sub-frames. Each of the plurality of sub-frames may include MAP information (a) of the macrocell. The macro-BS may perform data communication, for example, downlink communication, with the terminals at the plurality of sub-frames. Each sub-frame is a section where data communication between the macro-BS and the terminals is possible using the scheduling information and/or the MAP information that is transmitted/received at one time. A single sub-frame may have various time lengths, for example, 0.1 ms, 1 ms, 5 ms, 10 ms, and the like.

The control message (c) included in the control zone may be broadcasted from the macrocell at predetermined intervals. The predetermined intervals may be set in advance in the transmission frame. The control zone including the control message (c) may be incremented based on integer-fold unit of sub-frames. Referring to FIG. 6, the control zone may be incremented in the transmission frame based on five sub-frames.

The control message (c) may include information related to the usage plan of the shared resource. The usage plan may include information about which frequency resource will be used by the macrocell among the shared resource and when the macrocell will use the shared resource. The control message (c) may include information of the usage plan of the shared resource in each of the sub-frames included in the access zone.

In the control zone, the pico-BS may be operated as a reception mode. In this example, the pico-BS may periodically receive the network information and the synchronization information (b) of the macrocell to assist the pico-BS when it receives information from the macro-BS. The pico-BS may recognize the usage plan of the shared resource based on the control message (c) transmitted from the macro-BS.

The pico-BS may allocate the shared resource to corresponding terminals based on the usage plan of the shared resource. In this instance, the pico-BS may generate MAP information (d) of the allocated shared resource, and may transmit the MAP information (d) to terminals of the pico-BS in each of the sub-frames included in the access zone of the pico-BS. In this example, network information and synchronization information (e) of a picocell may be transmitted to terminals of the pico-BS via at least one of the sub-frames included in the access zone.

As a non-limiting example, a downlink transmission may include a base station or relay station during a downlink communication of a cellular system.

Figure 7:
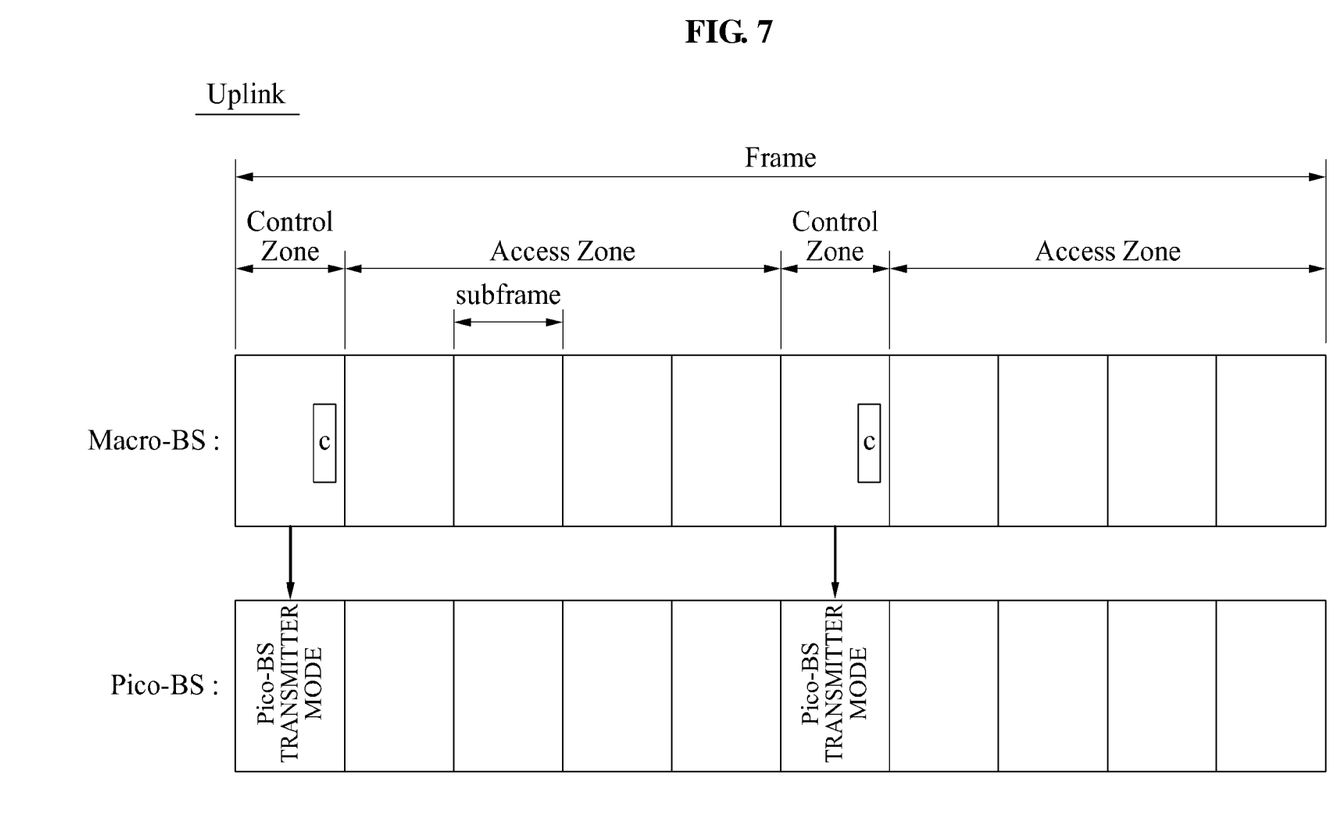
FIG. 7 is a diagram illustrating an exemplary uplink transmission frame.

FIG. 7 illustrates an exemplary uplink transmission frame.

Referring to FIG. 7, the uplink transmission frame may include a control zone and an access zone, as does the downlink transmission frame illustrated in FIG. 6. Each of a macro-BS and a pico-BS in the access zone may operate as a reception mode with respect to corresponding terminals, and may perform data communication, for example, uplink communication.

The pico-BS in the control zone in the uplink transmission frame, unlike in the downlink transmission frame, may operate as a transmission mode. For example, the pico-BS may transmit control information in a form of the control message (c) to the macro-BS. In this example, the control information is in the form of the control message (c) and may include picocell usage information related to the shared resource. The picocell usage information may include information about which frequency resource will be used by the picocell among the shared resource and when the picocell will use the shared resource.

As a non-limiting example, an uplink transmission may include a mobile terminal or relay station during an uplink communication of a cellular system.

Figure 8:
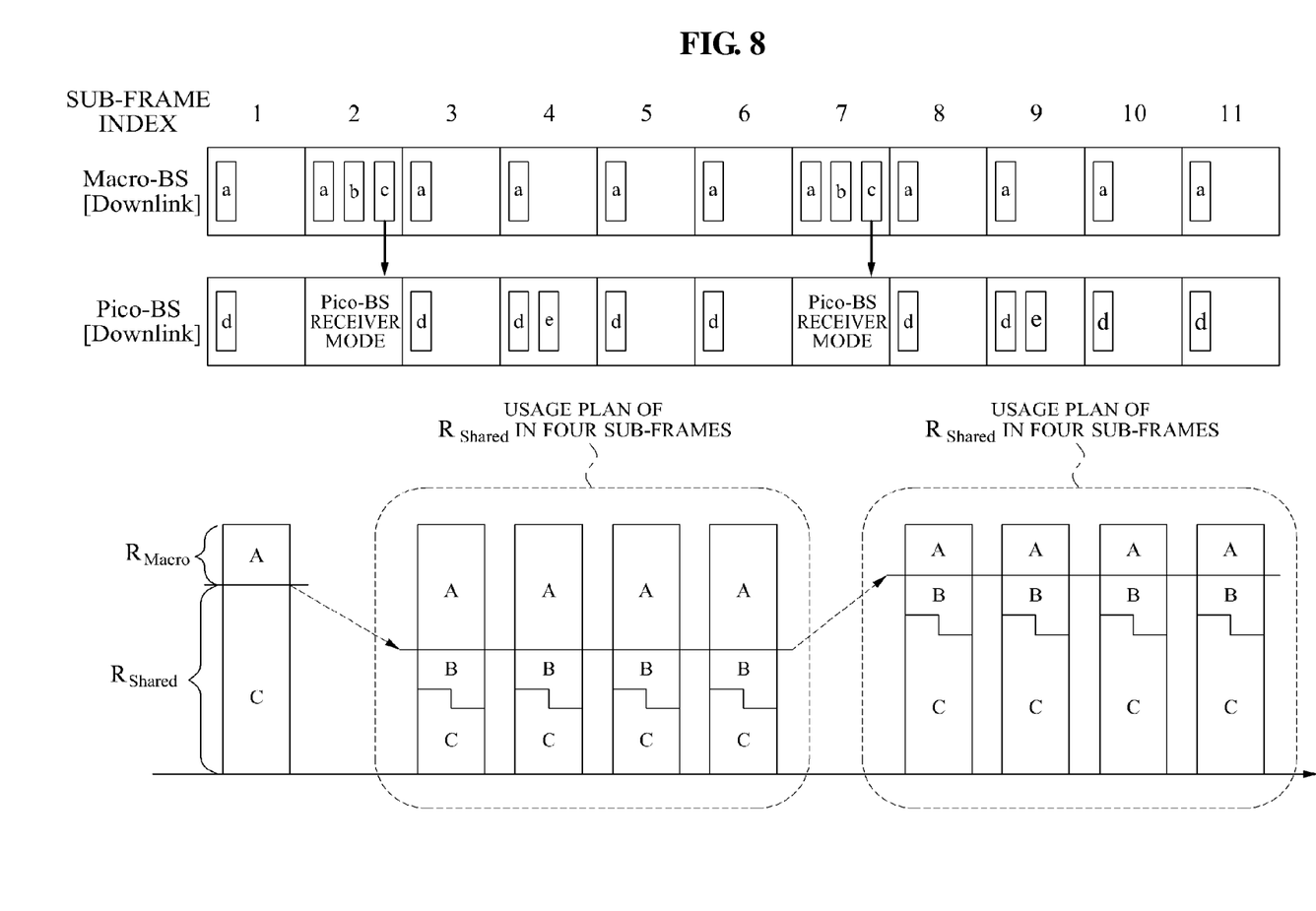
FIG. 8 is a diagram illustrating an exemplary transmission frame.

FIG. 8 illustrates an exemplary corresponding transmission frame. The transmission frame may be used to control the macrocell dedicated resource and the shared resource.

Referring to FIG. 8, a control zone appears in the second sub-frame, and in the seventh sub-frame of the downlink frame of the macro-BS. In this non-limiting example, the control zone periodically appears in the transmission frame every five sub-frames.

The macro-BS may transmit MAP information (a) of the macrocell to corresponding terminals in an access zone of the downlink. The macro-BS may transmit MAP information (a) of the macrocell, network information and synchronization information (b) of the macrocell, and a control message (c), in the control zone of the downlink The pico-BS may transmit MAP information (d) of the allocated shared resource to corresponding terminals, in the access zone of the downlink. In this non-limiting example, the pico-BS may additionally transmit network information and synchronization information (e) of a picocell in the fourth sub-frame and the ninth sub-frame.

The pico-BS may operate in a reception mode in the control zone of the downlink. For example, the pico-BS may recognize a usage plan of the shared resource using the control message (c) of the macrocell.

In this non-limiting example, the macro-BS intends to change the macrocell dedicated resource A and the shared resources B and C in third through sixth sub-frames. The macro-BS may generate the control message (c) including information related to the usage plan for the shared resource B in the third through sixth sub-frames. The macro-BS may transmit the generated control message (c) to the pico-BS, and the pico-BS may recognize the usage plan of the shared resource B in the third through the sixth sub-frames, based on the control message (c). The pico-BS may allocate the shared resource B or the shared resource C to terminals for the third through the sixth sub-frames, based on the usage plan of the shared resource B.

In the similar manner, when the macro-BS intends to change the macrocell dedicated resource A and the shared resources B and C in the eighth through the eleventh sub-frames, the macro-BS may generate the control message (c) including information related to the usage plan for the shared resource B in the eighth through the eleventh sub-frames. The macro-BS may transmit the generated control message (c) to the pico-BS from a control zone that is in the seventh sub-frame, and the pico-BS may recognize the usage plan of the shared resource B in the eighth through the eleventh sub-frames based on the control message (c). Accordingly, the pico-BS may allocate the shared resource B or the shared resource C to terminals for the eighth through the eleventh sub-frames based on the usage plan of the shared resource B.

The transmission frame described with reference to FIG. 6 through 8 may be used by various communication devices. The communication devices may include a base station, a relay station, a mobile terminal, a fixed terminal, various types of controller, a combination thereof, and the like.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

Figure 9:
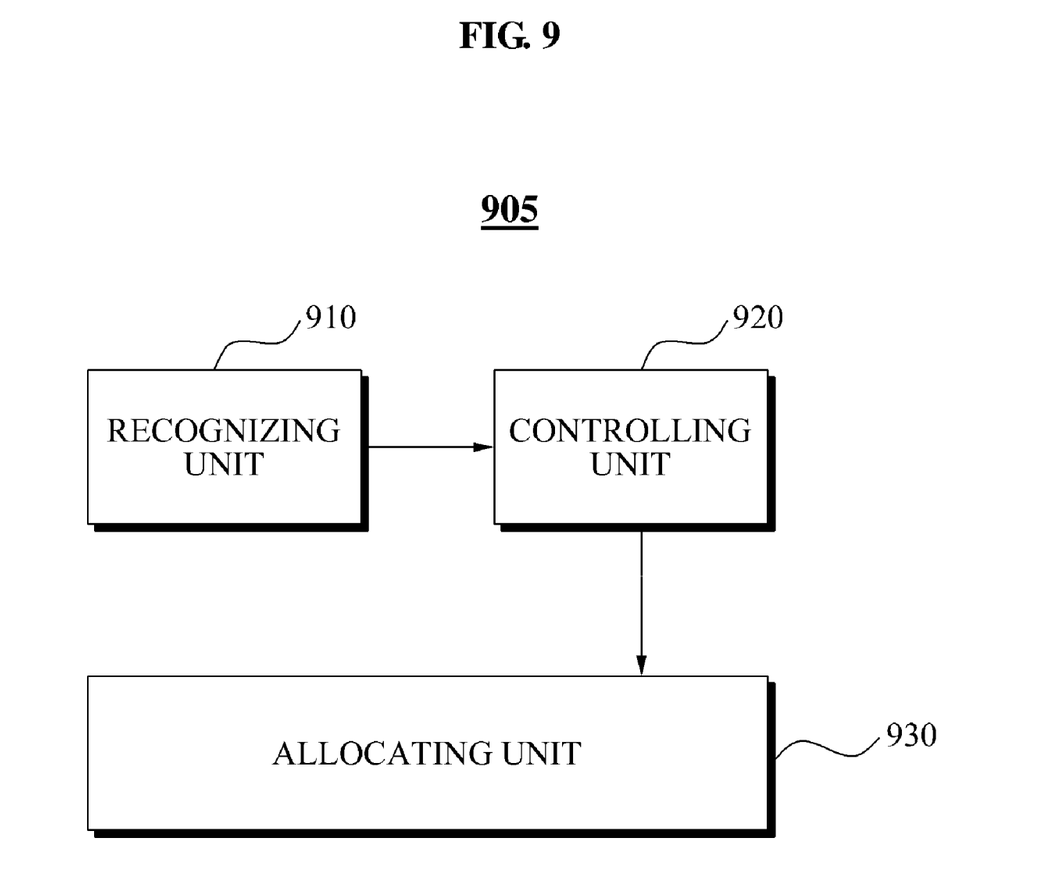
FIG. 9 is a block diagram illustrating an exemplary coordinator.

FIG. 9 illustrates an exemplary coordinator 905.

Referring to FIG. 9, the coordinator 905 may include a recognizing unit 910, a controlling unit 920, and an allocating unit 930.

The recognizing unit 910 may recognize a usage rate of a macrocell dedicated resource for a macrocell and a usage rate of a shared resource that the macrocell and a small cell use.

The controlling unit 920 may control the macrocell dedicated resource and the shared resource based on the usage rate of the macrocell dedicated resource and the usage rate of the shared resource.

The allocating unit 930 may allocate the controlled macrocell dedicated resource and the controlled shared resource to the macrocell and the small cell.

The macrocell may report the usage plan of the shared resource to the small cell before the macrocell uses the shared resource. When a resource that is used by the macrocell among the shared resource is allocated to terminals served by the small cell, the macrocell and the small cell may use one of a transmission power controlling scheme, an interference controlling scheme, and a multi-antenna scheme, to control a possible interference.

The coordinator 905 may be established within the macro-BS or adjacent to the macro-BS, and may be established apart from the macro-BS and independently operated.

The method described herein may control one or more small cells and one or more macrocells to reduce overhead in a communication system while increasing frequency efficiency. The method that may allocate schemes for processing or preventing interference between one or more small cells and one or more macrocells.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable labtop PC, a global positioning system (GPS) navigation, and devices such as a desktop PC, a high definition television (HDTV), an optical disc player, a setup box, a set-top box, and the like, capable of wireless communication or network communication consistent with that disclosed herein.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of allocating a resource for a hierarchical cellular system, the method comprising:
   recognizing a usage rate of a macrocell dedicated resource that a macrocell uses and a usage rate of a shared resource that the macrocell and a small cell use;
   controlling the macrocell dedicated resource and the shared resource based on the usage rate of the macrocell dedicated resource and the usage rate of the shared resource;
   allocating the controlled macrocell dedicated resource and the controlled shared resource to the macrocell and the small cell; and
   reporting, by the macrocell, a usage plan of the shared resource to the small cell before the macrocell uses the shared resources;
   wherein the controlling of the macrocell dedicated resource and the shared resource comprises decreasing an amount of the shared resource when the macrocell dedicated resource increases, and increasing an amount of the shared resource when the macrocell dedicated resource decreases.

2. The method of claim 1, wherein the small cell allocates the shared resource to terminals served by the small cell, and the allocation is based on a usage plan of the shared resource.

3. The method of claim 1, wherein the small cell recognizes a resource that is not used by the macrocell from among the shared resource, based on a usage plan of the shared resource, and allocates a recognized resource to terminals served by the small cell.

4. The method of claim 1, wherein a resource used by the macrocell from among the shared resource is allocated to terminals served by the small cell, and the macrocell and the small cell use at least one of a transmission power controlling scheme, an interference controlling scheme, and a multi-antenna transmission scheme to control interference.

5. The method of claim 1, wherein the small cell allocates a resource that is not used by the macrocell from among the shared resource to terminals having a relatively high mobility among terminals served by the small cell, and allocates a resource that is used by the macrocell from among the shared resource to terminals having a relatively low mobility among the terminals served by the small cell.

6. The method of claim 1, wherein at least one of the macrocell dedicated resource and the shared resource are allocated to terminals served by the macrocell based on the mobility of the terminals.

7. The method of claim 1, wherein the macrocell dedicated resource is allocated to terminals served by the macrocell that have a relatively high mobility, and the shared resource is allocated to terminals served by the macrocell that have a relatively low mobility.

8. The method of claim 1, wherein the macrocell reports a usage plan of the shared resource to the small cell at predetermined intervals before the macrocell uses the shared resource.

9. The method of claim 1, wherein the macrocell and the small cell use the same resource.

10. The method of claim 1, wherein the small cell has a cell coverage that overlaps with a cell coverage of the macrocell, and the small cell is one of a femtocell or a picocell.

11. A non-transitory computer readable medium comprising instructions that when executed by a computer, cause the computer to perform a method of allocating a resource for a hierarchical cellular system, the method comprising:
  recognizing a usage rate of a macrocell dedicated resource that a macrocell uses and a usage rate of shared resource that the macrocell and a small cell use;
  controlling the macrocell dedicated resource and the shared resource based on the usage rate of the macrocell dedicated resource and the usage rate of the shared resource; and
  allocating the controlled macrocell dedicated resource and the controlled shared resource to the macrocell and the small cell;
  reporting, by the macrocell, a usage plan of the shared resource to the small cell before the macrocell uses the shared resources;
  wherein the controlling of the macrocell dedicated resource and the shared resource comprises decreasing an amount of the shared resource when the macrocell dedicated resource increases, and increasing an amount of the shared resource when the macrocell dedicated resource decreases.

12. A coordinator for allocating a resource, the coordinator comprising:
  a recognizing unit to recognize a usage rate of a macrocell dedicated resource that a macrocell uses and a usage rate of shared resource that the macrocell and a small cell use;
  a controlling unit to control the macrocell dedicated resource and the shared resource based on the usage rate of the macrocell dedicated resource and the usage rate of the shared resource; and
  an allocating unit to allocate the controlled macrocell dedicated resource and the controlled shared resource to the macrocell and the small cell;
  a reporting unit to report a usage plan of the shared resource to the small cell before the macrocell uses the shared resources;
  wherein the controlling of the macrocell dedicated resource and the shared resource comprises decreasing an amount of the shared resource when the macrocell dedicated resource increases, and increasing an amount of the shared resource when the macrocell dedicated resource decreases.

13. The coordinator of claim 12, wherein a resource that is used by the macrocell from among the shared resource is allocated to terminals served by the small cell, and the macrocell and the small cell use at least one of a transmission power controlling scheme, an interference controlling scheme, and a multi-antenna transmission scheme, to control interference.

14. A communication device for performing communication according to a transmission frame in a hierarchical cellular system, wherein the transmission frame comprises a control zone including a control message related to a usage plan of a shared resource, and a given resource is classified into one of a macrocell dedicated resource that a macrocell uses and the shared resource that the macrocell and a small cell use;
  wherein the macrocell reports the usage plan of the shared resource to the small cell using the control message, and the small cell allocates the shared resource to terminals served by the small cell based on the usage plan of the shared resource;
  wherein the transmission frame further comprises an access zone that includes at least one of a sub-frame for data communication of the macrocell and a sub-frame for data communication of the small cell, wherein:
  the at least one sub-frame for the data communication of the macrocell includes MAP information of a resource allocated to the macrocell among the macrocell dedicated resource and the shared resource; and
  the at least one sub-frame for the data communication of the small cell includes MAP information of a resource among the shared resource scheduled for the small cell.

15. The communication device of claim 14, wherein the at least one subframe for the data communication of the small cell includes at least one of synchronization information of the small cell and network information of the small cell.

16. The communication device of claim 14, wherein the control zone further comprises at least one of synchronization information of the macrocell and network information of the macrocell.

17. The communication device of claim 14, wherein the macrocell dedicated resource and the shared resource are controlled based on a usage rate of the macrocell dedicated resource and a usage rate of the shared resource.

18. The communication device of claim 14, wherein the transmission frame comprises the control zone at predetermined intervals.

* * * * *